Feb. 24, 1970 N. SOLODUCHA 3,497,326
APPARATUS FOR PRODUCING TITANIUM TETRACHLORIDE AND OTHER HALIDES
Filed Jan. 18, 1967 3 Sheets-Sheet 1
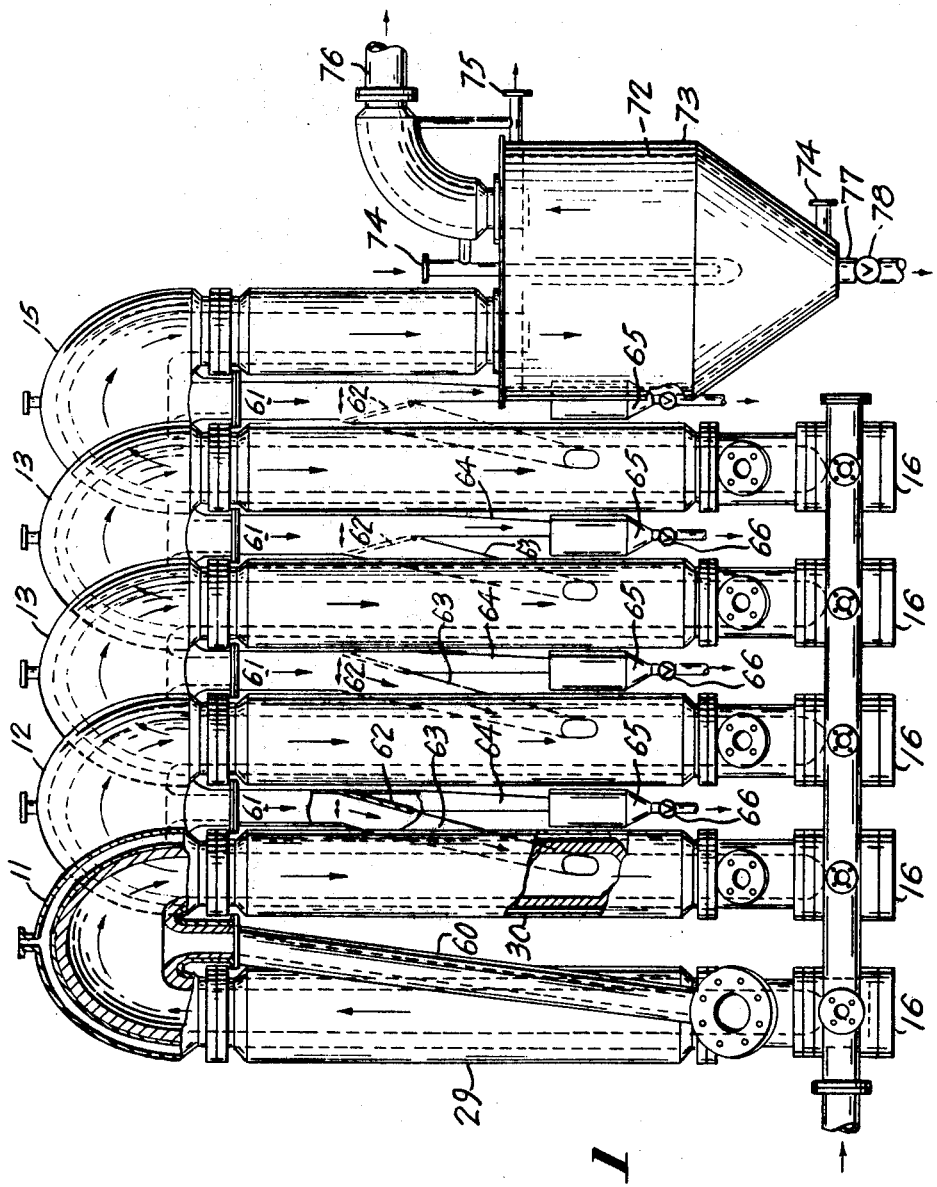
Fig_1
INVENTOR
Nicolas SOLODUCHA
ATTORNEY

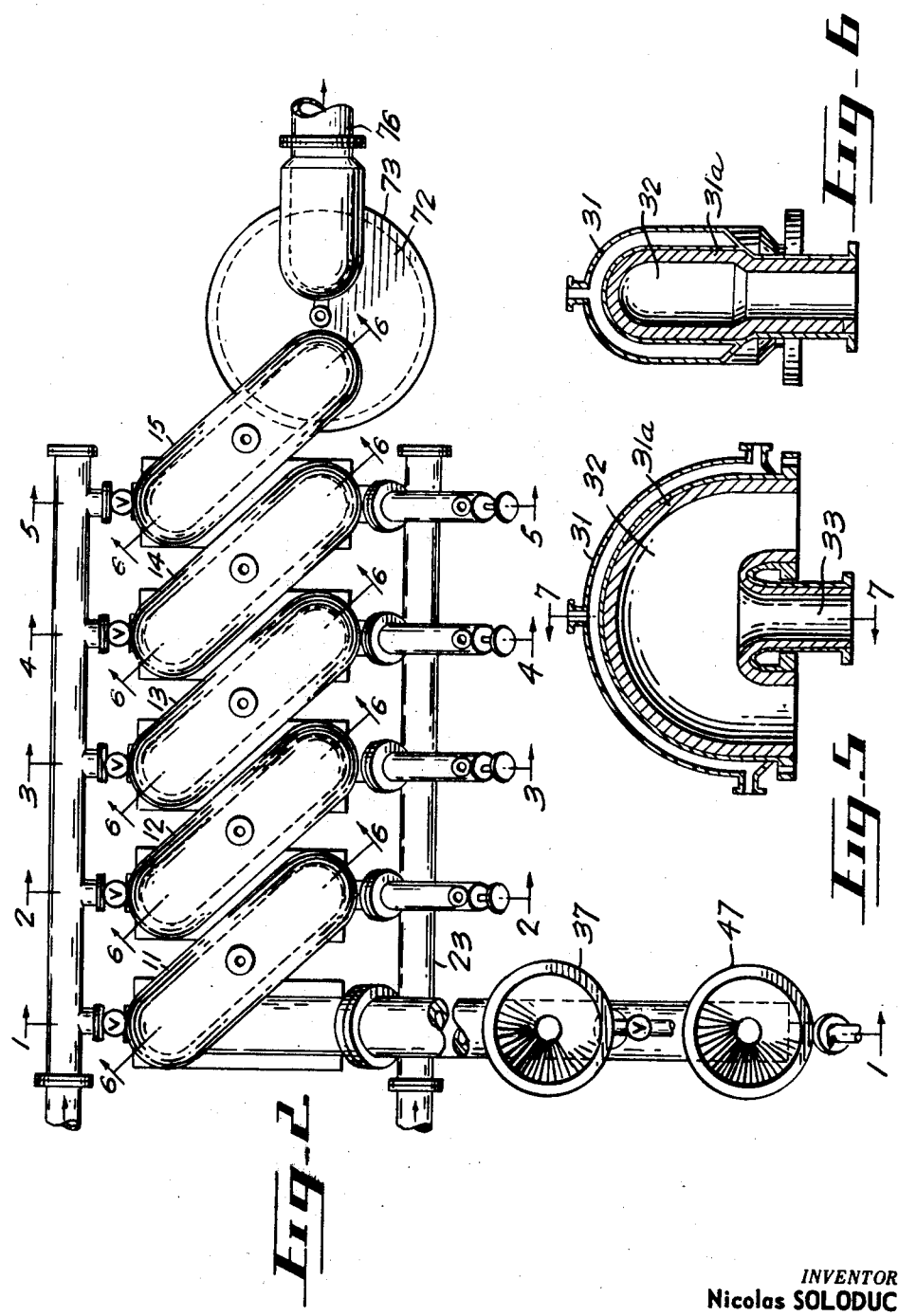

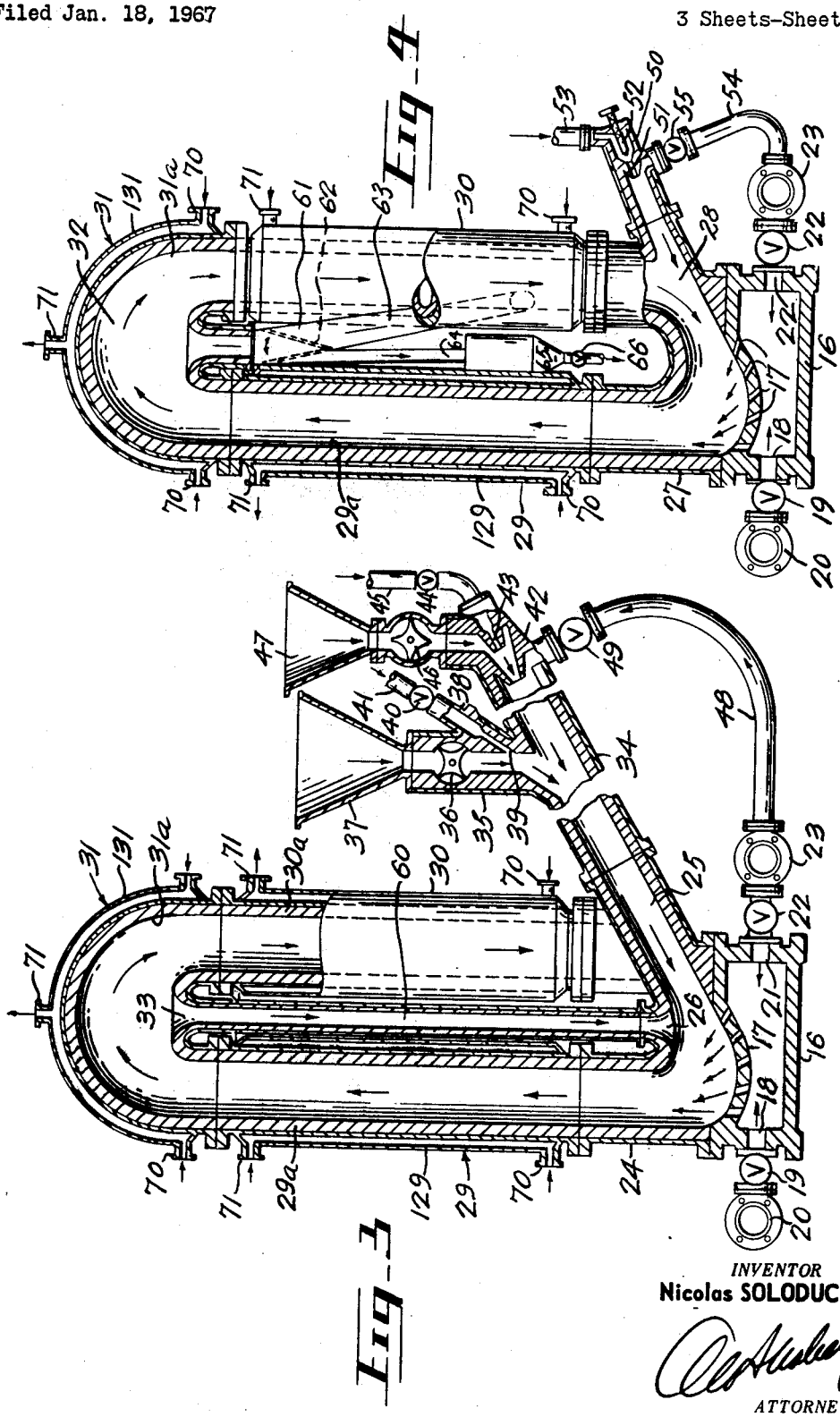

United States Patent Office 3,497,326
Patented Feb. 24, 1970

3,497,326
**APPARATUS FOR PRODUCING TITANIUM
TETRACHLORIDE AND OTHER HALIDES**
Nicolas Soloducha, 4051 Harvard Ave.,
Montreal, Quebec, Canada
Filed Jan. 18, 1967, Ser. No. 610,173
Int. Cl. B07b 9/02; C01g 23/02; C01b 9/02
U.S. Cl. 23—284                                    8 Claims

ABSTRACT OF THE DISCLOSURE

An apparatus for producing titanium tetrachloride and other halides from finely divided titanium bearing ore is provided. The apparatus comprises a plurality of interconnected hollow tubular links disposed in substantially vertical alignment and interconnected one to the other to form an elongated spiral, each of said tubular links having first and second gas conducting passages interconnected at their upper ends and each having a gas distributing chamber disposed adjacent the lower end of said first gas conducting passage, gas feeding means leading into said gas distribution chamber, material feeding means and material preheating means connected into each link adjacent the beginning of said first gas conducting passage and in advance of said gas distributing chamber, and gas by-pass means leading from the connection between upper ends of said first and second passages to adjacent the lower end of at least one of said passages to permit recirculation of heavier particles of said materials said by-pass means in said second and subsequent links extending from the said connection between said first and second gas conducting passages to a connection with a solid particle collector exteriorly of said links or alternatively to a connection with the said second gas conducting passage adjacent its lower end, and damper means controlling said by-pass connections.

---

This invention relates to an apparatus for the production of titanium tetrachloride and other halides. More particularly, this invention relates to an apparatus for the chlorination of finely powdered titanium bearing material having a maximum particle size of 150 mesh and more particularly those materials having a maximum particle size of 325 mesh with the bulk being particles of one micron or submicron crystal sizes.

At the present time, two methods are commonly employed for the large scale manufacture of titanium tetrachloride:

(a) The older method in which the rutile or other ground titanium ore is mixed with ground charcoal or petroleum coke, the mixture bricketted with pitch, the brickettes baked at 500–800° C. and chlorinated at 700–1000° C. in shaft kilns;

(b) The second and more recent method in which the closely sized rutile is intimately mixed with powdered coke or charcoal and is chlorinated at 800–1000° C. in a fluidized bed with chlorine.

In utilizing method a, the initial bricketting is expensive and the use of pitch (a source of hydrogen) in combination with chlorine forms hydrochloride gases which leads to corrosion problems. The newer method b of course eliminates these problems but is still not satisfactory with respect to fine powdered material. The method b is practiced commercially with chlorination of material of a grain closely sized from 20 to 150 mesh of rutile in fluidized beds. In this process smaller particles, for example, minus 150 mesh are blown out of the reactor and accordingly present a waste. As is known, chlorination in a fluidized bed is in practice the bubbling of chlorine gas through a bed of closely sized rutile or other titanium bearing materials.

As an attempt to overcome the problem of wastage of fine powdered material in a process of this nature, S. S. Cole and L. W. Rowe in U.S. Patent No. 2,555,374, issued June 5, 1951, proposed flash chlorination of very finely divided metal oxides by charging the finely divided charged material into the bottom of an established bed of optimum sized rutile, ilmenite or even an inert material such as sand. Chlorination should occur before the dust passes through the bed. The major requirement is that the bed be less chlorinatable than the charge. For example, a charge all minus 50 microns size, is blended with 20% weight basis ground to 20–60 mesh coke and fed to the bottom of the bed with the chlorine gas stream. Check valves must be used to permit entry of the charge and prevent the bed from discharging when the gas flow is cut off. Such check valves are a source of trouble during the chlorination at temperature of 600–800° C., especially with large area chlorinators. The coarse pieces of coke must be used to reduce compaction of the established bed of optimum size rutile, which serves as restraining bed to prevent the finely divided particles of the charge and chlorine to pass too early through the fluidized bed.

Although chlorination of finely divided particles should proceed much faster than the bigger particles of rutile, it was found in practice that chlorination in a restraining bed of 20 to 150 mesh sizes of rutile that only about 22 lbs. of finely divided beneficiated titanium material (85% $TiO_2$ and 2.6% $FeO$) could be chlorinated per square foot per hour by flash chlorination in an experimental small chlorinator.

Such small quantities of chlorination per square foot area of chlorinator can be explained as a large volume of the chlorinator is occupied by the restraining bed of rutile which practically does not take part in the chlorination process. It is possible in large units, with deeper restraining bed, to speed the chlorination per square foot area per hour of chlorinator by speeding the flow of chlorine and charged solids. However, the deeper restraining bed will set in a similar way as the filter medium in any filter; this is to keep the solids at the lower part of the restraining bed and the larger part of chlorine at the higher speed of the gases will escape the chlorination due to lack of charge on the top of the bed. The efficiency of utilization of chlorine will be lowered considerably.

It is well known that the titanium material contains compounds of alkaline earth or alkali metals that upon chlorination produce chloride salts of these materials in the molten form. Such molten chlorides coat the particles present in the reactor bed and destroy the efficiency of the reaction. The presence of alkaline earth or alkali metal chlorides in fluidized bed of the chlorinator can plug and cement the reactor completely. I. J. Krchma in his U.S. Patent No. 2,701,180 proposes to chlorinate titanium bearing material with alkali earth and alkali metal compounds such as titanium slag, which contains from five to fifteen percent of such compounds, by removing continuously from the reaction zone of a fluidized bed a sufficient portion of solids of said fluidized bed (up to seven parts per one part of charged slag); then water leaching the solids thus removed, washing and drying the leached product and returning said purified dried solids to the reaction zone again for chlorination in fluidized bed. This process is very costly and cumbersome.

The same can be said, concerning the flash chlorination in restraining bed described in U.S. Patent No. 2,555,374. The flash chlorination cannot be effectively applied for finely divided titanium bearing material, minus 150 mesh or less, without continuously removing a sufficient portion of charged material and a part of restraining bed, from three to five parts by weight per part of charged material, if the charged material contains one or more percent of impurities such as calcium, magnesium, or aluminum compounds.

Many other attempts have been made to overcome these and other problems and many patents have issued showing processes and apparatus for chlorination of titanium bearing materials, as for example the following:

U.S. Patents Nos. 1,179,344 L. E. Barton, Apr. 18, 1916, 1,707,257 Charles de Bomden, Apr. 2, 1929, 1,845,342 B. D. Saklatwalla, Feb. 16, 1932, 2,184,884 I. E. Muskat and R. H. Taylor, Dec. 26, 1939, 2,184,885 I. E. Muskat and R. H. Taylor, Dec. 26, 1939, 2,184,887 I. E. Muskat and R. H. Taylor, Dec. 26, 1939, 2,378,675 W. Y. Agnew, June 19, 1945, 2,463,396 I. J. Krchma, Mar. 1, 1949, 2,533,021 I. J. Krchma, Dec. 5, 1950, 2,555,374 L. W. Rowe and S. S. Cole, June 5, 1951, 2,701,179 R. M. McKinney, Feb. 1, 1955, 2,701,180 I. J. Krchma, Feb. 1, 1955, 2,747,987 J. M. Daubenspeck and R. S. McNell May 29, 1956, 2,758,019 J. M. Daubenspeck and R. D. Tooney, Aug. 7, 1956, 2,855,273 A. W. Evans et al., Oct. 7, 1958, 3,101,249 J. C. Priscu, Aug. 20, 1963, 3,149,911 E. Fornasieri et al., Sept. 22, 1964.

Canadian Patents Nos. 221,537 G. Gartered and M. Devaux, Aug. 1, 1922, 377,396 D. H. Dawson et al., Nov. 1, 1938.

The applicant, being aware of these patents and other prior art, has developed a novel process and apparatus whereby most of the problems and disadvantages of the preceding art have been overcome. More specifically, I have found that the chlorination of finely divided titanium bearing material such as, leach product obtained by pressure leaching ilmenite or from titanium slag or directly rutile or Sorel slag ground to minus 150 mesh, and in one embodiment to minus 325 mesh can be chlorinated with maximum efficiency and results, in a continuous process according to this invention. Wherein a gas stream of chlorine is provided and solid particles of finely divided titanium material and carbon are fed into and suspended in said gas stream in a circulating cycle which can be repeated as many times as required to obtain the desired complete chlorination. In this process in the first stage of chlorination (at temperatures of 600–1000° C.), the reaction $2TiO_2 + Cl_2 + 3C = 2TiCl_4 + 2CO + CO_2$ takes place when solid particles of titanium material and carbon strike each other in the stream of chlorine gas; in the second end stage of chlorination (at temperatures of 1000° C. or over) the chlorination is finished according to the equation $TiO_2 + 2Cl_2 + 2CO = TiCl_4 + 2CO_2$. In this way full chlorination can be achieved with nearly 100% utilization of charged chlorine and solid $TiO_2$. The end products of such chlorination will be only gases of titanium tetrachloride, carbon monoxide and minor amounts of carbon dioxide and other gases.

As is well known, the chlorination of titanium bearing material proceeds according to the following reaction equation and the free energy changes listed in Table I below.

TABLE I

| | $F°$ 600° C. | $F°$ 800° C. | $F°$ 1,000° C. |
|---|---|---|---|
| (1) $TiO_2 + 2Cl_2 + C = TiCl_4 + CO_2$ | −67 Kcal. | −70 Kcal. | −72 Kcal. |
| (2) $TiO_2 + 2Cl_2 + 2C = TiCl_4 + 2CO$ | −63 Kcal. | −74 Kcal. | −84 Kcal. |
| (3) $TiO_2 + 2Cl_2 + 2CO = TiCl_4 + 2CO_2$ | −72 Kcal. | −66 Kcal. | −60 Kcal. |
| (4) $TiO_2 + 2Cl_2 = TiCl_4 + O_2$ | +27 Kcal. | +24 Kcal. | +22 Kcal. |

The carbon or carbon monoxide play an important part as reductant in the chlorination, since without carbon the reaction is difficult as it can be seen from the free energy change of Equation 4.

Thermodynamical considerations show that for the chlorination of titanium bearing material a mixture of carbon monoxide and chlorine should prove to be as efficient as chlorine in the presence of carbon. But the experiments show that the velocity of chlorination with a mixture of carbon monoxide and chlorine is slower below 1000° C. than with carbon and chlorine, and that this velocity is proportional to the CO content, but independent of the $Cl_2$ concentration, whereas the velocity of chlorination with carbon and chlorine is proportional to the $Cl_2$ content and independent of the CO content of the gase phase. At 1000° C. or over the chlorination with the mixture of carbon monoxide and chlorine is faster and is independent of the chlorine content. Therefore the last traces of the chlorine and titanium material at this temperature can be chlorinated and utilized in the stream of carbon monoxide if the ratio of the charge of chlorine and titanium material is properly adjusted. The desired maximum efficiency of hundred per cent of chlorination can be achieved under ideal conditions.

The many uses of titanium tetrachloride are well known; one such use being in the production of pigments for rubber, paints, plastics etc.

The process of the invention will be more fully understood by reference to the following detailed description and as illustrated by reference to the accompanying drawings showing a preferred form of apparatus by means of which the process may be carried out, and in which;

FIGURE 1 is a front view of a multi-cycle circulating flow apparatus according to the invention having a plurality of interconnected tubular gas conducting links in elongated spiral relationship with gas and material feeding, discharge, and control devices.

FIGURE 2 is a top plan view of the apparatus of FIGURE 1.

FIGURE 3 is a sectional view of FIGURE 2 as seen along the lines 1—1 and 6—6 showing the structure of the first link in more detail particularly through the feeding and preheating arrangements.

FIGURE 4 is a typical section of the second or any following link of the apparatus as seen along the lines 2—2, 3—3, 4—4 and 5—5 of FIGURE 2.

FIGURE 5 is a typical section of the upper elbow on each interconnected link as seen along the line 6—6 of FIGURE 2.

FIGURE 6 is a cross section of the elbow construction shown in FIGURE 5 as seen along the line 7—7.

With reference to the drawings, the chlorination apparatus is shown as comprising several interconnected hollow tubular links (five shown) forming an elongated spiral to which is connected, at the bottom of each link, gas distributing chambers with nozzles for chlorine and other gases. In addition, the first link of the spiral arrangement has feeding and preheating devices as will be described below.

In order that the main elements of this apparatus may be clearly understood reference will be made to the drawing FIGURES 1, 2, 3, 4 and 5 where 11 indicates the first link of the spiral chlorinator and 12, 13, 14 and 15 the second, third, fourth and fifth link respectively as shown in FIGS. 1 and 2. The number of links forming the spiral can be as many as required, five being shown in the present drawing. On FIG. 3, which is a section of line 1—1 (FIG. 2) of the first link 11, 16 represents the gas distributing chamber with nozzles 17 which is typical for the other chambers of the following links indicated by the same numbers in FIG. 4, which differ only in the area and quantity of nozzles in each chamber which must be made to suit the quantity of chlorine and other gases required to pass to each link of the spiral. On each chamber 16 an opening 18, with valve 19 and distributing pipe 20 is provided for supplying chlorine gas under pressure, for chlorination, at the bottom of each link. On the opposite side of each chamber 16 another opening 21, with valve 22 and distributing pipe 23 is provided for supplying carbon monoxide under pressure.

On each chamber 16 lower elbows 24 and 27 of the successive spiral links are mounted. For the first link (FIG. 3) an elbow 24 with receiving port 25 and opening 26 is provided. For the following links of the spiral, as shown in FIG. 4, a typical elbow 27 with port 28 is provided. Two hollow upright cylindrical members 29 and 30 are mounted on the lower elbow of each link of the spiral. The two cylindrical members 29 and 30 are connected on the top with an upper elbow 31, typical section of which is shown of FIGS. 5 and 6. The upper elbow 31 must not only fit the diameters of each members 29 and 30 but it must have at the turning point of the elbow 31 a widening of the inside area 32 and provided with an opening 33.

To each such upper elbow opening 33 a downwardly extending pipe is connected. For the first link a pipe 60 makes connection between the opening 33 of upper elbow 31 and the opening 26 of lower elbow 24. To all other openings 33 of the following links of the spiral, a pipe 61 is connected in downward direction, with a flap type valve or damper 62 which controls flow through this pipe into two branches 63 and 64, from which 63 is directed to the hollow cylindrical member 30 of the preceding link and the second branch 64 is connected with a collector 65 with release valve 66. This arrangement is provided for recycling large particles back for a second circulation cycle in the link and accordingly repeated chlorination and for rejecting by pipe 64 any undesirable particles such as silica and other impurities, the selection being made by the valve 62.

For feeding of the solid charge to the lower elbow 24 a combustion chamber 34 is connected with a feeding device 35, comprising a lock type feeder 36, with hopper 37, an injector 38 with nozzle 39, and regulating valve 40, and inlet pipe 41. For preheating a solid charge in the chamber 34, a burner 42 is provided with an air injector 43, regulating valve 44 and inlet pipe 45. If powdered petroleum coke or charcoal is burned, a lock type feeder 46 with hopper 47 is used, or if carbon monoxide is to be burned the gas will be delivered by the pipeline 48 with regulating valve 49 from distributing pipe 23 to burner 42.

To the lower elbows 27 of each succeeding spiral links, as shown on FIG. 4, is mounted a gas burner 50 comprising an injector 51, regulating valve 52, inlet pipe 53 for air or other gas and pipeline 54 with regulating valve 55 for delivering carbon monoxide from pipe 23 to each burner 50, if required. As is known, the burner 42 as well as burners 50 must have ignition devices, for example, high intensity electrical spark ignition devices (not shown).

As is shown most clearly in the sections of FIGURES 2, 3, 4 and 5, all parts making up the links of the present spiral chlorinator are provided with jacketed steel shells (see for example, 129, 131, FIGURES 3 and 4), and lined inside with refractory resistance material (29a, and 30a, and 31a of FIGS. 3–4) to provide moderate thickness of lining. The jacketed shells 129–131 are furnished with inlets 70 and outlets 71, for cooling medium circulation. This cooling arrangement, the jacketed steel shells and the inside brick lining of moderate thickness are necessary to keep the inside walls of the lining at temperatures between 400–800° C. In this way, the brick lining at this temperature will be covered with chloride impurities having high temperature melting points and the lining will be protected from attack by the hot chlorine.

It is possible to make the interconnected links of the spiral chlorinator with jacketed shell from steel without the brick lining. Since by intensive cooling the steel wall of inside shell of spiral can be kept at low temperature at which temperature the steel wall will also be covered with high temperature melting chlorides and prevented in this way from further attack of hot chlorine. However, without the brick lining the heat losses by cooling will not be permissible for proper operation of the chlorination without burning additional fuel.

In the first stage of chlorination and to keep the solids in gas suspension, the speed of the flowstream of the gases in the cylindrical members of the first and partly in the second link of the chlorinator must be maintained higher than those required in the following stages of chlorination where the solid particles will have been diminished to millimicron sizes and therefore can be kept in gas suspension with a very low speed of flow gases, for example, about one-half foot per second. Taking into consideration what was mentioned above and the volume changes from chemical reactions and from temperature rises during the chlorination, the diameters of the members making up each next links following the first link must be proportionally enlarged from 10 to 30%, depending on quantity of links in spiral, so as to have in the last link cylindrical members of four to five times larger area than those in the first link. The passage area of lower elbows 24 and 27 should be built smaller in diameter than the cylindrical members and upper elbows. In this way, the required higher speed of the flowing gases can be achieved in the lower elbows, and the injection of carbon monoxide or other gases in the second and following spiral links which is required to accelerate solid particles suspended in the gas stream can be brought to a minimum.

One $TiO_2$ bearing ore which is suitable for use in my process, though unsuitable for use in the processes of the prior art, obtained by pressure leaching ferrotitanium ores is at high temperature with dilute sulphuric acid or hydrochloride acid or by selective chlorination. This ore has a maximum particle size in the range of minus 50 microns (or around minus 325 mesh) with the major portion of the ore having a much smaller particle size ranging from a few microns to submicron sizes. As an example the leach product from St. Urbain ilmenite has the following analysis:

$TiO_2$—91%, FeO—0.26, $Fe_2O_3$—2.7%, $SiO_2$—2.3%, MnO—0.03%, $Al_2O_3$—0.25%, MgO—0.40%, CaO—0.06%, $Cr_2O_3$—0.03%, $V_2O_5$—0.04%, $P_2O_5$—0.02%, $ZrO_2$—0.04%, $Cb_2O_3$—0.01%, $Sb_2O_3$—0.02%, L.O.I. 2.85%.

All are in minus 50 micron crystal sizes from which over 60% is minus 3 microns.

Operation

Before starting chlorination, the combustion chamber 34 and the entire inside wall of chlorinator must be heated to about 800° C. by burning powdered coke, charcoal, or carbon monoxide using burner 42, air injector 43 and lock type feeder 46 if powdered carbon from hopper 47 is burned. If carbon monoxide is burned, this gas can be taken from pipe 23 through pipe 48 by opening the regulating valve 49 and air injector valve 44. Then the finely divided titanium bearing material of minus 150 mesh blended with a minimum of 10% to a maximum of 50% by weight of ground to —150 mesh coke or charcoal, is continuously fed through the hopper 37 and lock type feeder 36 and injected into the flame stream of burning gases in chamber 34 by a jet of compressed chlorine or carbon monoxide or air, supplied by injector 38. Simultaneously chlorine, under a pressure of about 30 p.s.i. in the distributing pipe 20, is injected through the nozzles 17, in an amount stoichiometrically adjusted to the titanium bearing material, as a jet stream as shown by arrows on FIG. 3 and FIG. 4, by opening valves 19. The chlorine is directed in the upright direction of the cylindrical members of two or more of the first links of the spiral, so that about 60% to 80% of chlorine is directed to first and the balance to the next links. For the third, fourth and fifth links only monoxide gas from distributing pipe 23 need be injected through the nozzles to keep the constant flow of stream of chlorinating gases and charged solids in suspension in the chlorinator. Carbon monoxide also can be added partly to the first and second links to maintain the required flow of gases and solids. The jet of incoming chlorine gas and carbon monoxide through the nozzles set up a violent agitation, interimpaction and attrition of the particles of titanium bearing material and coke.

At the starting point of the chlorination, especially in first and second links, the reaction starts rapidly and takes place according to the equations $$TiO_2 + 2Cl_2 + C = TiCl_4 + CO_2$$

and $TiO_2 + 2Cl_2 + 2C = TiCl_4 + 2CO$. In the later stages in the third, fourth and next links, where the solid particles will diminish to millimicron sizes and the temperature reach 1000° C. or more, the chlorination will be finished according to the equation:

$$TiO_2 + 2Cl_2 + 2CO = TiCl_4 + 2CO_2$$

Chlorination in the presence of carbon monoxide is independent on the content of chlorine. Therefore, chlorine and titanium material can be utilized to the last traces, if the ratio of chlorine and titanium material is properly adjusted and the carbon monoxide is present in excess as the end of chlorination. It must be stressed that the stream of gases and solids in gas suspension must be kept at the lowest possible speed in the hollow link members of the spiral chlorinator, i.e., only at the minimal speed required to prevent the solids from settling, and to pass the highest point of upper elbow of each spiral link.

As previously described, in each upper elbow 31, a widening of area 32 is provided. By passing through this area the speed of flow of gases will diminish two to three times according to the size of the enlarged area 32. The unreacted larger particles of charged solids will fall out of the stream and through the opening 33 to be fed by the selective pipes 61, 63 to return to the foregoing link of spiral or to be rejected. As shown on FIG. 3, in the first link 11 the big particles can return to starting point of lower elbow 24 through opening 33, pipe 60 and opening 26 for recirculation. The big particles of solids in the second, third, fourth and next links can be returned to recirculation through the opening 33, pipe 61, switch valve 62 and pipe 63 or by switching the valves 62, through the pipes 64, the solid particles such as silica and others can be thrown out to collector 65 and rejected.

Not only leach products, or rutile ground to fines, but also titanium slag, can profitably chlorinated by this method in spiral chlorinator of the invention without danger of plugging or cementing the reaction zone with molten chlorides of alkali earth metals as may occur with the known chlorinators.

As an example, if a material such as Sorel titanium slag having high silica and high alkali earth metal compounds, ground to minus 150 mesh is chlorinated in gas stream of chlorine in accordance with this invention, the solid of silica and of earth alkali metals, chlorination of which proceeds much slower than of titanium and iron compounds, will be covered immediately with molten chlorides of these elements and will be prevented from further chlorination. When they come to the end stage of chlorination where the flow speed of gases through the third, fourth and fifth links of spiral is very slow, they will be rejected through the pipe 64 and collector 65.

The end products of such chlorination will be gases free from chlorine and solid particles of charged materials, mostly gases of titanium tetrachloride and minor amounts of other chlorides, carbon monoxide and carbon dioxide gases in the approximate ratio of 80% CO to 20% $CO_2$ and the minor amount of neutral gases such as nitrogen and others.

The product gases after passing the chlorinator are at temperature of about 1000° C. and must be cooled and the titanium tetrachloride separated and purified. The separation and purification operation is not within the scope of this invention and can be accomplished by any of the well known methods of purification and distillation of titanium tetrachloride.

In the apparatus shown by way of example in the present drawings, the gases from fifth link 15 go downward to the cooling and first step purification separator 72 and through the pipe 76 to further purification and distillation (not shown). The cooling separator 72 with jacket 73 has inlet 74 and outlet 75 for a cooling medium, such as slightly compressed air, and outlet 77 with valve 78 for rejecting the molten chlorides of iron and other condensed in cooling separator 72. The compressed air, by passing the cooling separator 72, is heated by cooling the product gases and this heated air can be used to preheat the solid charge of titanium and carbon as well as can be used as preheated air for burning purposes. This cooling first step purification separator 72 can be installed in series of two or more and countercurrent cooling units. If desired the air to be supplied to the reactor can be used as the cooling fluid thus economizing heating requirements.

After separation of titanium tetrachloride and other chlorides by cooling and liquefying, the carbon monoxide, carbon dioxide and other gases with about 50% of CO content can be recycled and used for chlorination and heating purposes. A part of these gases compressed to about 30 p.s.i. with 50% of CO content will be injected through the nozzle 17, a part can be burned by burners 42 and 50 as described above and the balance can be used for other heating purposes. The content of carbon monoxide in these affluent gases can be kept at required levels by charging more or less of carbon such as coke or charcoal as reductant with titanium charge.

While the invention is particularly adapted for production of titanium tetrachloride, halogenation of other similar metal oxides and production of other halides can also be accomplished by the present method and described apparatus. Further this process could be used for larger particle sizes but is believed to be most operable and economically feasible in the minus 150 mesh particle size and more particularly the minus 325 mesh particle size.

Obviously, many modifications and variations of the invention may be made without departing from the essence and scope thereof and only such limitations as are recited in the appended claims should be applied.

I claim:

1. An apparatus for the production of titanium chloride or other halides from finely divided titanium bearing material on the order of 150 mesh or smaller sizes, comprising in combination, a plurality of interconnected hollow tubular links disposed in substantially vertical alignment and interconnected one to the other to form an elongated spiral, each of said tubular links having first and second gas conducting passages interconnected at their upper ends and each having a gas distributing chamber disposed adjacent the lower end of said first gas conducting passage, gas feeding means leading into said gas distribution chamber, material feeding means and material preheating means connected into each link adjacent the beginning of said first gas conducting passage and in advance of said gas distributing chamber, and gas by-pass means leading from the connection between upper ends of said first and second passages to adjacent the lower end of at least one of said passages to permit recirculation of heavier particles of said materials, said by-pass means in said second and subsequent links extending from the said connection between said first and second gas conducting passages to a connection to a solid particle collector exteriorly of said links or alternatively to a connection with the said second gas conducting passage adjacent its lower end, and damper means controlling said by-pass connections.

2. The apparatus of claim 1 wherein said gas distribution chamber is divided from the interior of said gas conducting passages by a perforate wall, and said gas feeding means consisting of at least one gas injection nozzle leading into said gas distribution chamber.

3. The apparatus of claim 1 wherein said material feeding means consists of a tubular member leading directly into the lower portion of said link first gas conducting passage and controlled material delivery means and an auxiliary burner means connected to said tubular member.

4. The apparatus of claim 2 wherein said material feeding means consists of a tubular member leading directly into the lower portion of said link first gas conducting passage and controlled material delivery means and an auxiliary burner means connected to said tubular member.

5. The apparatus of claim 3 wherein an auxiliary burner means is connected into each of said second and following links adjacent the lower end of said second gas conducting passage.

6. The apparatus of claim 2 wherein an auxiliary burner means is connected into each of said second and following links adjacent the lower end of said second gas conducting passage.

7. The apparatus of claim 1 wherein said by-pass means in said first link extends from the said connection between said first and second gas conducting passages to adjacent the lower end of said first gas conducting passage.

8. An apparatus as claimed in claim 1 wherein each of said tubular links are enlarged at the point of interconnection of said first and second gas passages to provide a widening of said passages at their upper ends to reduce velocity of said gas stream to such a degree that larger solid particles of material will be dropped from said gas stream into said gas by-pass means.

References Cited

UNITED STATES PATENTS

| | | | |
|---|---|---|---|
| 2,297,726 | 10/1942 | Stephanoff | 23—252 XR |
| 2,550,390 | 4/1951 | Stephanoff | 241—5 XR |
| 2,590,219 | 3/1952 | Stephanoff | 241—5 XR |
| 3,403,451 | 10/1968 | Stephanoff | 34—10 |

JAMES H. TAYMAN, JR., Primary Examiner

U.S. Cl. X.R.

23—87; 34—10, 57; 241—5, 19, 39